(12) United States Patent
Bennett (10) Patent No.: US 6,618,743 B1
(45) Date of Patent: Sep. 9, 2003

(54) METHOD AND SYSTEM FOR PROVIDING DISCRETE USER CELLS IN A UNIX-BASED ENVIRONMENT

(75) Inventor: Erik J. Bennett, Corvallis, OR (US)

(73) Assignee: OneWorld Internetworking, Inc., Portland, OR (US)

( * ) Notice: Subject to any disclaimer, the term of this patent is extended or adjusted under 35 U.S.C. 154(b) by 0 days.

(21) Appl. No.: 09/169,548

(22) Filed: Oct. 9, 1998

(51) Int. Cl.[7] .......................... G06F 17/00; G06F 17/30; G06F 12/00
(52) U.S. Cl. .......................... 709/104; 707/10; 707/200; 709/105
(58) Field of Search ................................. 709/100–200; 707/10, 200

(56) References Cited

U.S. PATENT DOCUMENTS

| | | | | |
|---|---|---|---|---|
| 5,421,011 A | * | 5/1995 | Camillone et al. | 709/104 |
| 5,835,482 A | * | 11/1998 | Allen | 370/225 |
| 6,014,715 A | * | 1/2000 | Stoevhase | 710/11 |
| 6,078,945 A | * | 6/2000 | Hinsley | 709/105 |
| 6,263,066 B1 | * | 7/2001 | Shtivelman et al. | 379/266.06 |
| 6,295,353 B1 | * | 9/2001 | Flockhart et al. | 379/265.02 |
| 6,389,421 B1 | * | 5/2002 | Hawkins et al. | 707/10 |

* cited by examiner

*Primary Examiner*—John Follansbee
*Assistant Examiner*—Kenneth Tang
(74) *Attorney, Agent, or Firm*—Robert D. Varitz, P.C.

(57) ABSTRACT

A system of multiple work areas for operating within a computer system, wherein the computer system includes a CPU, a memory module and a disc storage facility, includes plural autonomous resource units (ARUs), for running user processes, wherein each ARU includes a discrete IP address, and wherein a process running in one ARU is inaccessible by another ARU; a discrete identifier assigned to each ARU; and a connector which extends between each ARU and the computer system CPU and memory module. A method of providing multiple, discrete, secure work areas in a computer system having a disc storage facility, a CPU, a memory module, and a set of IP addresses, includes designating plural autonomous resource units in the disc storage facility; providing a barrier to prevent inter-ARU communications; assigning a discrete identifier to each ARU; and connecting each ARU to a CPU and memory module associated with the disc storage facility.

20 Claims, 5 Drawing Sheets

METHOD AND SYSTEM FOR PROVIDING DISCRETE USER CELLS IN A UNIX-BASED ENVIRONMENT

FIELD OF THE INVENTION

This invention relates to a method and system for allowing multiple users to have autonomous work areas in a computer system, and specifically to a method and system for providing discrete user cells in a UNIX-based system which is part of a world-wide communications network.

BACKGROUND OF THE INVENTION

The UNIX operating system has proven to be particularly adaptable at providing communications over a world-wide communications network, often referred to as the Internet. The UNIX operating system is particularly adept at interactive time-sharing operations, and allowing a number of users to share data on a single disc storage facility, or hard drive.

As the Internet has grown, and large numbers of users have "logged-on", the Internet is frequently taxed, along with the file servers which form the system. Obviously, one way to relieve the stress on the system is to provide a server for each user, with a "user" being that entity which occupies a discrete identifier, or domain name. In many instances, however, it is not practical for a user to have its own file server. While it is certainly feasible to partition a disc storage facility in a computer to provide space for a user, such partitioning does not provide the requisite autonomy and privacy required, nor is the partitioning of the hard drive sufficiently flexible to allow a user to occupy a required amount of space, without, at the same time, tieing up unused disc space. Additionally, the standard UNIX process table does not provide the requisite separation of multiple processes running at the request of multiple users. This can result in unwanted access to a process, or to one process interfering with a like process running for another user.

The UNIX system provides an environment in which user-mode programs may be executed. Once a program is running, it is referred to as a process. The UNIX kernel provides access to devices, such as network interface, CPU execution time and mass, or disc, storage. Each UNIX kernel has a notion of its own identity and a network Internet Protocol (IP) number. Generally, all of the activity on a particular system takes place in a global process arena, with each process associated with a given host being identifiable by other computers on the network as being associated with that host. Known systems, such as that described in U.S. Pat. No. 5,421,011 to Camillone et al., suggest accounting procedures for tracking various users, or groups of users, but does not teach or suggest segregation of multiple users in a single computer system, wherein the users have a discrete network identity.

From the standpoint of security, however, the ability of the system to cross partition boundaries, or the ability of one user to gain access to the space of another user by "hacking," is of concern to users of the Internet. Existing systems do not provide adequate protection.

SUMMARY OF THE INVENTION

A system of multiple work areas for operating within a computer system, wherein the computer system includes a CPU, a memory module and a disc storage facility, includes plural autonomous resource units (ARUs) for running user processes, wherein each ARU includes a discrete IP address, and wherein a process running in one ARU is inaccessible by another ARU; a discrete identifier assigned to each ARU; and a connector which extends between each ARU and the computer system CPU and memory module.

A method of providing multiple, discrete, secure work areas in a computer system having a disc storage facility, a CPU, a memory module and a set of IP addresses, includes designating plural autonomous resource units in the disc storage facility; providing a barrier to prevent inter-ARU communications; assigning a discrete identifier to each ARU; and connecting each ARU to a CPU and memory module associated with the disc storage facility.

An object of the invention s to provide a computer system and method wherein a single user's processes are not visible or accessible by other users of the system.

Another object of the invention is to provide for plural, autonomous resource units on a disc storage facility wherein the autonomous resource units are not accessible from one another.

A further object of the invention is to provide secure division of a disc storage facility for multiple users.

These and other objects and advantages of the invention will become more fully apparent as the description which follows is read in conjunction with the drawings.

DETAILED DESCRIPTION OF THE PREFERRED EMBODIMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

Figure 1:
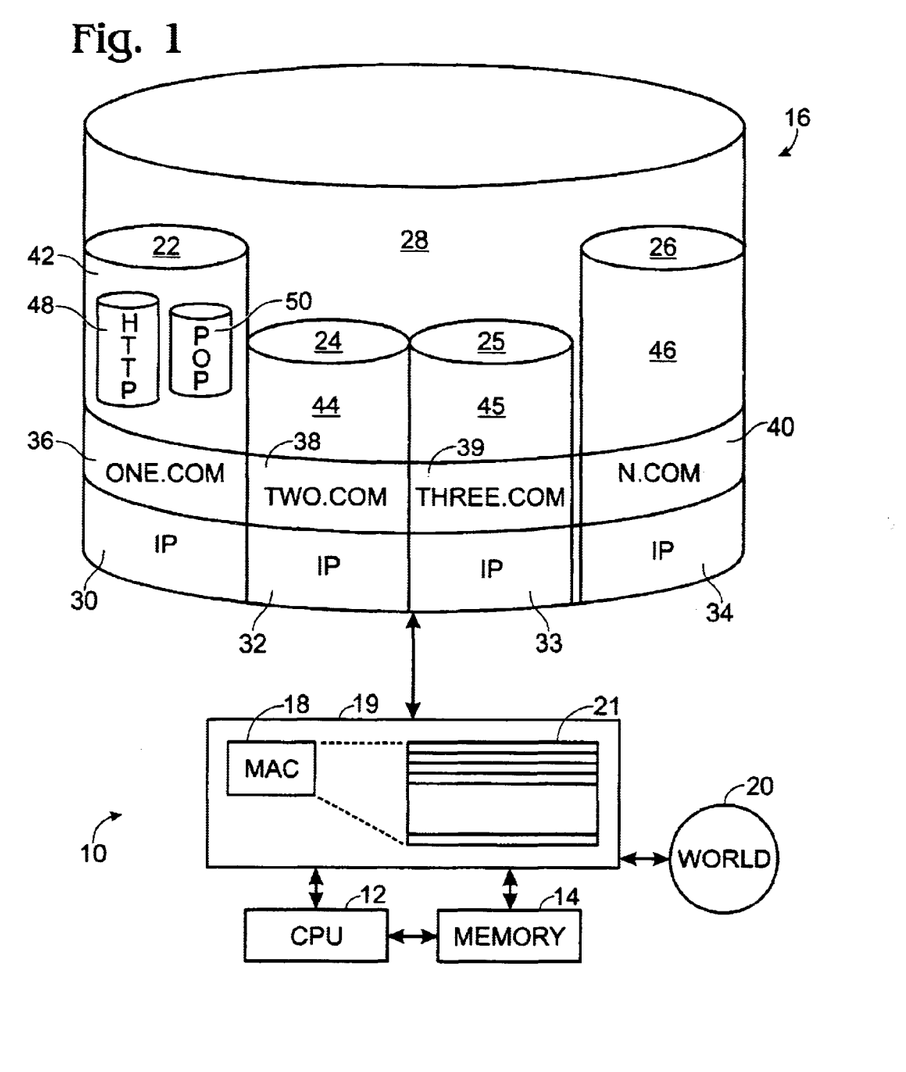
FIG. 1 is a schematic representation of a disc storage facility containing plural autonomous resource units.

Referring initially to FIG. 1, a computer system is depicted generally at 10. System 10 includes a central processing unit 12 and a memory module 14. CPU 12 and memory module 14 are shared by all of the functionalities in system 10.

A disc storage facility 16 is provided. Disc storage facility 16 may be a single hard drive, or may include of a number of disc storage units. A functionality of the system and method of the invention is that the resources may be spread over a number of discrete disc storage units comprising a single disc storage facility.

A media access control(MAC) 18 is provided as part of an Ethernet board 19 which connects system 10 to the world 20 The MAC address is associated with the Ethernet board and uniquely identifies the Ethernet board, and hence computer system 10. Ethernet board 19 includes a set of IP addresses, collectively represented at 21. An Ethernet board may have any number of IP addresses, although not all available IP addresses may be used by every computer system.

Disc storage facility 16 is divided into plural autonomous resource units 22, 24, 25, and 26. Any part of disc storage facility 16 that is not occupied by an autonomous resource unit is considered to be free space 28, available to CPU 12, or for use as additional ARUs.

Each ARU includes a storage area for its associate IP address 30, 32, 35, and 34. Additionally, each ARU includes space for a domain name 36, 38, 39, and 40 Finally, each ARU includes a storage area 42, 44, 45, and 46, for running user processes, which may contain sub-areas for storing files in HTTP format 48 and/or areas for POP mailboxes 50.

A portion of a process table is shown in Table 1, below. Table 1 includes conventional UNIX fields, such as name of the process, the process_id, the owner of the process, the file system, or directory structure location of the process, and the size of the process. The process table of the invention includes an additional field, called cell_id. Cell_id contains an identifier associated with a specific user and that user's ARU.

TABLE 1

PROCESS TABLE

| name | process_id | owner | file system | size | cell_id |
|---|---|---|---|---|---|
| web | 81 | tom | fs1 | 10 M | one |
| mail | 881 | dick | fs1 | 7 M | one |
| mail | 103 | harry | fs5 | 7 M | two |
| web | 272 | harry 2 | fs3 | 10 M | three |
| web | 284 | harry 2 | fs3 | 10 M | three |
| ... | ... | ... | ... | ... | ... |

A new table is added by the invention, and is called perhost. A portion of the perhost table is depicted as Table 2. The perhost table includes a cell_id field and a IP address field that is associated with a specific user and that user's ARU. Both the process table and the perhost table are look-up tables that are generated during system boot.

TABLE 2

PERHOST TABLE

| cell_id | IP Address |
|---|---|
| ONE | 143.227.44.4 |
| TWO | 143.227.44.5 |
| THREE | 143.227.44.9 |
| FOUR | 143.227.44.14 |
| FIVE | 143.227.45.6 |

A number of programs, or applications, may be contained in free space 28 of disc storage facility 16. These programs are available to any ARU upon the request by a user of the ARU. Once a process is assigned a cell_id, any child process inherits the cell_id, which may not be changed. There may be any number of processes running simultaneously in system 10, some of which are parents and some of which are childs. However, a process that has been opened with a particular cell_id cannot signal, or use data from, another child process, or a parent, having a different cell_id, without specific instructions from the users of both ARUs to transmit data from one ARU to another. This is akin to user of one domain name transmitting data, or allowing a user with another domain name to access data.

To further explain the invention, as UNIX loads, or runs, a program, thereby generating a process, UNIX tracks the process in the standard process table. The process is loaded into virtual RAM, with a part of the process running in memory 14, and the remainder of the process being immediately available in the proper ARU on the hard drive. Each process is tagged with a cell_id, and the process table, having been modified, or "carved up," so as to prevent data flow between users' processes, can only grant access to the processes operating under the instructions of a specific user.

Ethernet board 19 is also "carved up" in that under conventional UNIX protocol, any process may access any of the IP addresses associated with the board. The perhost table restricts access to a specific IP address on the board, or to several designated IP addresses. Also, under normal UNIX protocol, a process can read, or interrogate, any of the IP addresses associated with the Ethernet board. Again, the perhost table grants access to specific IP addresses only. It will be appreciated that a process does not "know" that it is being restricted—a process may "ask" for access to all IP addresses, however, the perhost table only maps a connection to the specific IP address(es) that are associated with the user and the user's ARU, thereby coercing the unmodified process to use only a specified IP address(es). The process operates as it would under standard UNIX, never knowing that it is restricted to specific IP address(es).

The invention is accomplished by modifying the UNIX kernel with specific code, examples of which follow:
  Data types introduced:
    typedef u_int32_t cellid_t;
The preceding code introduces a data type, cellid, having values identified herein as cell_id, to identify the user of an ARU and to determine space in the process table and perhost table. This allows computer system 10 to appear as a plurality of UNIX-based systems over a network interface. Existing server software is not changed to accomplish such autonomy. Processes within each ARU operate with their own network identity and are neither visible to other processes in other ARUs, nor have the ability to signal or interfere with processes in other ARUs. While the explanation of the method and system of the invention are set in a UNIX environment, it will be appreciated by those of skill in the art that the invention is applicable to other computer operating systems.

Modifications to Struct_proc
  To enable the allocation of resources to groups of processes, a new identity is added to the data structure: struct_proc. Every process running in the kernel is associated with a struct_proc which serves to, among other things, describe which resource the process may access. By adding the cell_id data type, the process may be restricted by cell_id, in addition to, or instead of, traditional mechanisms such as group_id.

Introduction of Struct_perhost
  Certain information must be maintained for each cell, such as its bind address for network connections. To accommodate these data, a new data structure, struct_perhost, is introduced for every cell to store such information.

Modifications to System Boot
  At boot time, the data structures for each cell are initialized.

Figure 2:
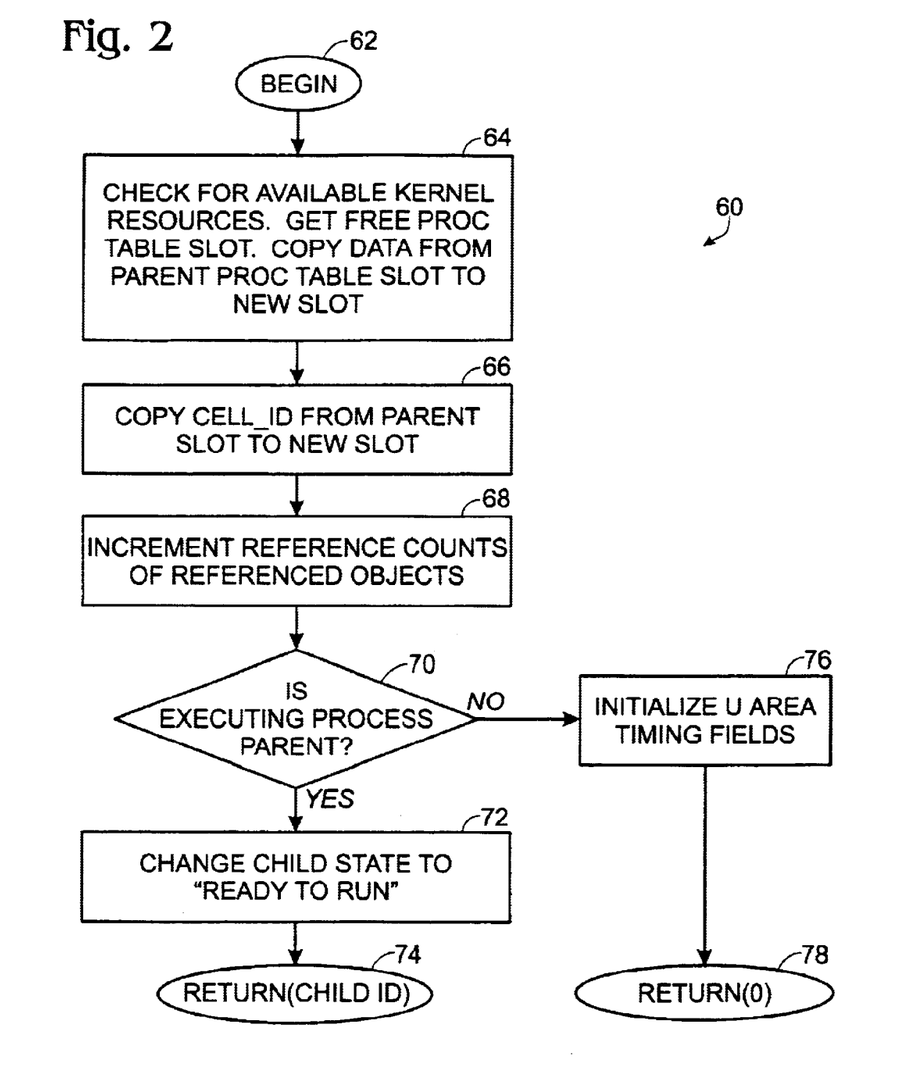
FIG. 2 is a block diagram of a modified fork( ) command of the invention.

Modifications to System Calls
  Referring now to FIG. 2, a modified fork( ) system call, 60, is depicted. The fork( ) system call, 60, or its relatives, e.g. vfork( ), is the only way to create a new process under UNIX. The fork system call causes a program or a process to create a clone of itself, called the child process. The fork system call is modified to also clone the cell_id in addition to the normally replicated data and to embed the cell_id into each process, thus propagating the cell_id.

The fork( ) system call, 60 commences with a begin command 62. In the next step, the system checks for available kernel resources, locates an available process table slot, and copies data from the patent process table slot to a new slot, 64.

The next step involves copying the cell_id from the parent slot to a new slot, block 66. Next, block 68, the reference counts of referenced objects are incremented. The system determines if the executing process is a parent process, block 70. If so, the child state is changed to "ready to run," block 72, and the system returns the child_id, block 74. If the executing process is not the parent, the user area timing fields are initialized, block 76, in which case the system returns, block 78, to beginning block 62.

Figure 3:
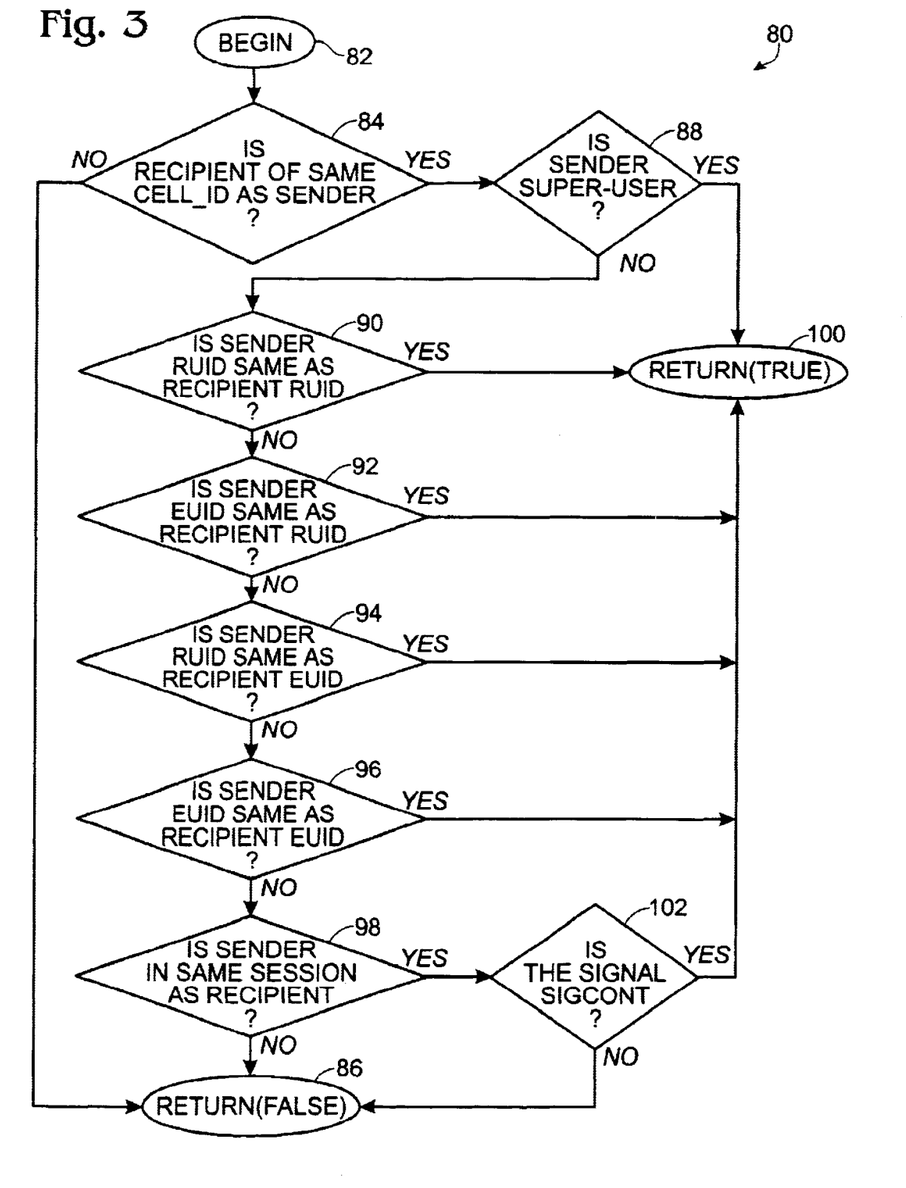
FIG. 3 is a block diagram of modified kill( ) and killpg( ) commands of the invention.

Turning now to FIG. 3, the kill( ) and killpg( ) system calls, 80, are used by processes to send messages, or signals, to one another. Normally, this is restricted by user id, process group_id or session_id of the sending and receiving processes. This call is modified to include the standard queries, and to insure that both processes have the same cell_id.

The kill( ) or killpg( ) system call begins, block 82, and initially determines whether the recipient has the same cell_id as the sender, block 84. If the recipient does not have the same cell_id as the sender, the system call returns, block 86, with a false answer, and the process terminates, thereby enforcing the segregation of user processes.

As previously noted, the system call continues with standard queries to determine whether the sender is a super user, block 88, to determine if the sender has the same real user id as the recipient, block 90, to determine if the sender has the same effective user id as the recipient, block 92, to determine if the sender real user id is the same as the recipient effective user id, block 94, to determine if the sender effective user id is the same as the recipient effective user id, block 96, and finally, to determine if the sender is in the same session as the recipient, block 98. As is shown in FIG. 3, negative responses to any of the queries result in a false return, block 86, and departure from the system call, thereby further enforcing segregation of user processes. An affirmative response provides a true return, block 100, which allows the system to continue. A final step, only following block 98, determines whether the signal is continuous, block 102.

Figure 4:
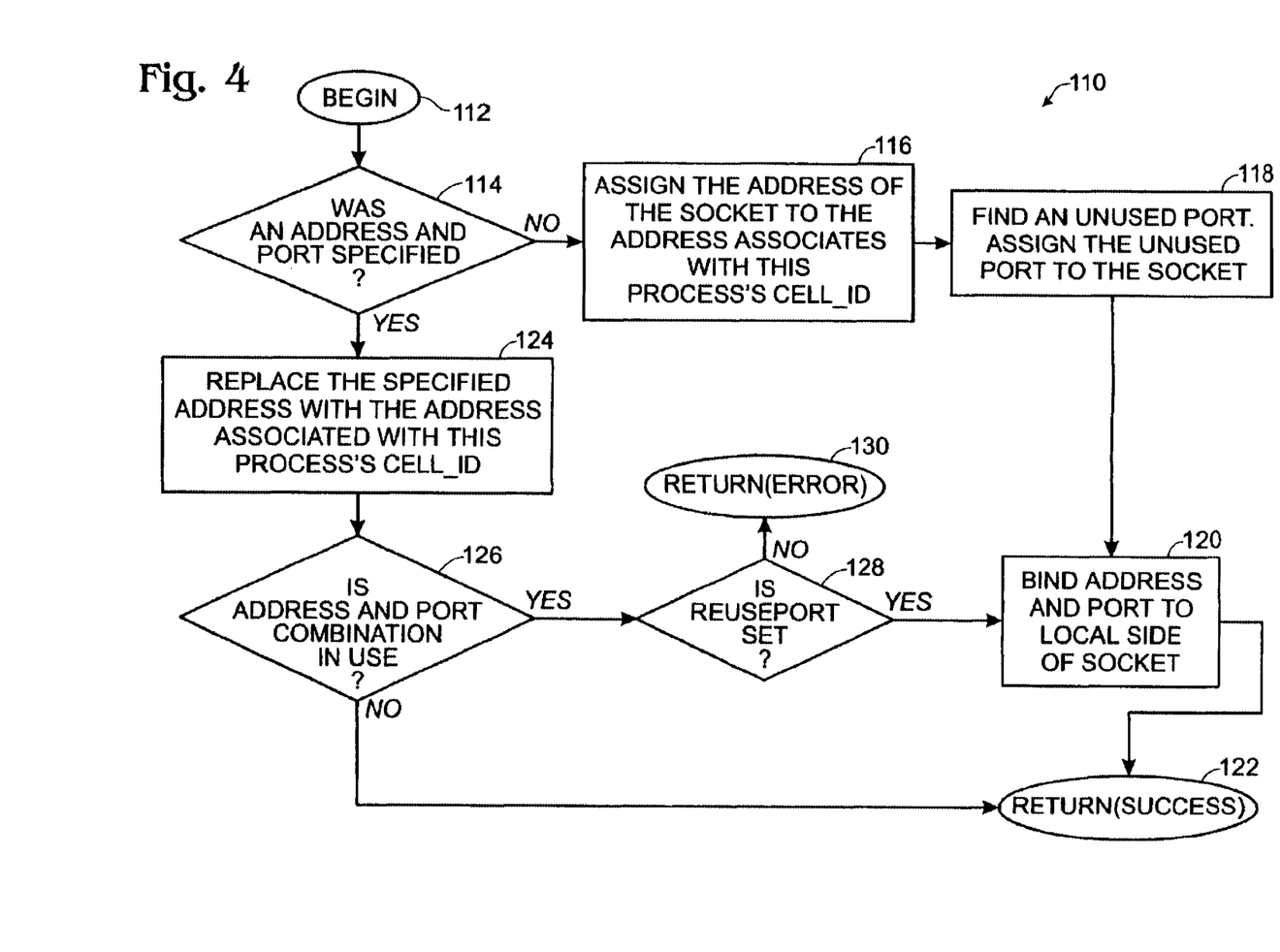
FIG. 4 is a block diagram of a modified in_pcbbind( ) command of the invention.

The in_pcbbind( ) system call, 110, shown in FIG. 4, is used in assigning a name to a network socket address family(AF INET). In the standard UNIX OS, a process may bind to any address/port in system 10, provided that the address/port is not already in use. As modified, these calls enforce a cell specific address, stored in struct_perhost, for every inbound and outbound network connection.

The in_pcbbind( ) system call commences with the begin block 112. The system is queried to determine whether an address and port have been specified, block 114. If the answer to this query is no, the system assigns the address of the socket to the address associated with the processes cell_id, block 116. The system then locates an unused port and assigns the unused port to the socket in question, block 118. Next, the address and port are bound to the local side of the socket, block 120, which results in a successful return, block 122.

In the event that an address and port are specified in block 114, the specified address is replaced with the address associated with the processes cell_id, block 124. The system is then queried to determine whether the address and port combination is in use, block 126. If the answer to the query is no, the address and port are again bound to the local side of the socket, block 120. If the address and port combination is in use, the system is queried to determine whether a value for reuseport is set, block 128. If the answer to this query is no, the system returns an error, block 130. If reuseport is set, the address and port are bound to the local side of the socket, block 120, completing the in_pcbbind( ) system call.

Figure 5:
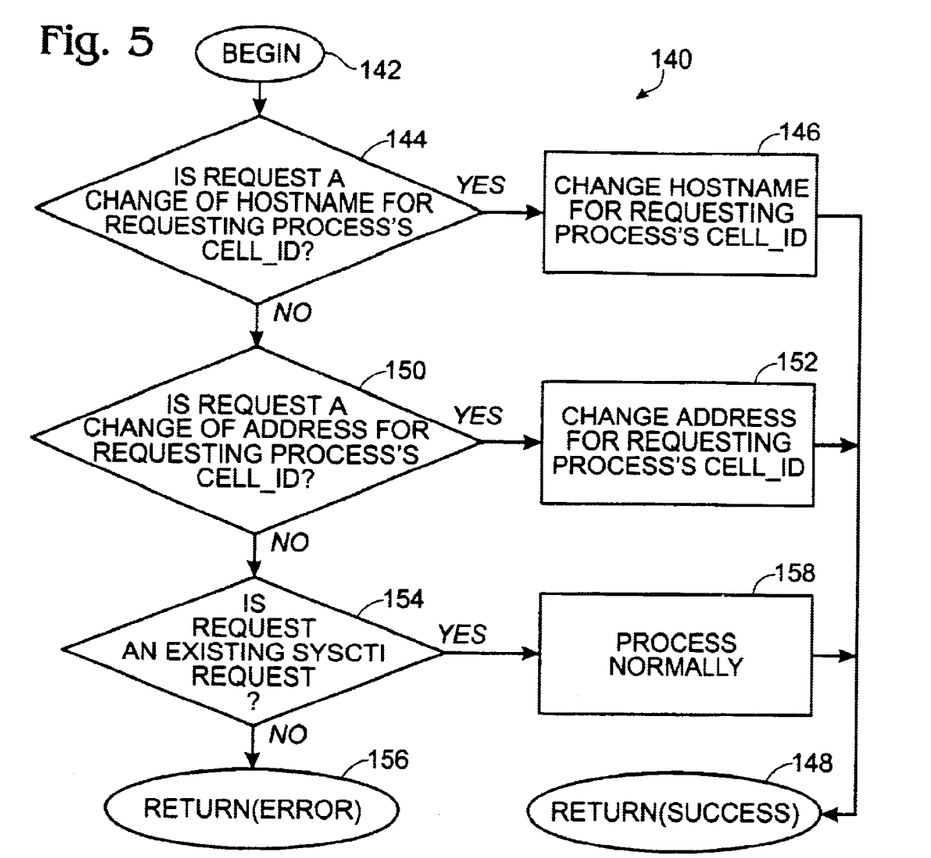
FIG. 5 is a block diagram of a modified sysctl( ) command of the invention.

The sysctl( ) system call, 140, shown in FIG. 5, is used to get or set parameters inside the UNIX kernel, such as the IP address or the hostname of the machine, and to populate the perhost table. This call is modified to restrict setting and retrieving certain data to a cell-specific copy, located in struct_perhost, rather than to operate on global data in system 10.

Sysctl( ) system call 140 commences with begin block 142 and a query, 144, to determine if a request for a change of the host name is part of a requesting processes cell_id. If this query is answered in the affirmative, the system changes the host name for the requesting processes cell_id, block 146. This results in a successful return, block 148.

In the event that block 144 is answered to the negative, the system is queried to determine if a request for a change of address accompanies the requesting processes cell_id, block 150. If this is answered in the affirmative, the address for the requesting process cell_id is changed, block 152, and the system call returns successfully, block 148. In the event that block 150 is answered in the negative, the system is queried to determine if the request is an existing sysctl request, block 154. If this query is answered in the negative, the system returns an error, block 156. If block 154 is answered in the affirmative, the system is allowed to process under normal conditions, block 158, which provides a successful return, block 148.

The following is an example of how the system and method of the invention may be implemented:

```
struct perhost {
    struct in_addr c_ip;
    char c_hostname[MAXHOSTNAMELEN];
    int c_hostnamelen;
    char c_nisdomainname[MAXHOSTNAMELEN];
    int c_nisdomainnamelen;
    long c_hostid;
    long c_features;
};
```

Figure 6:
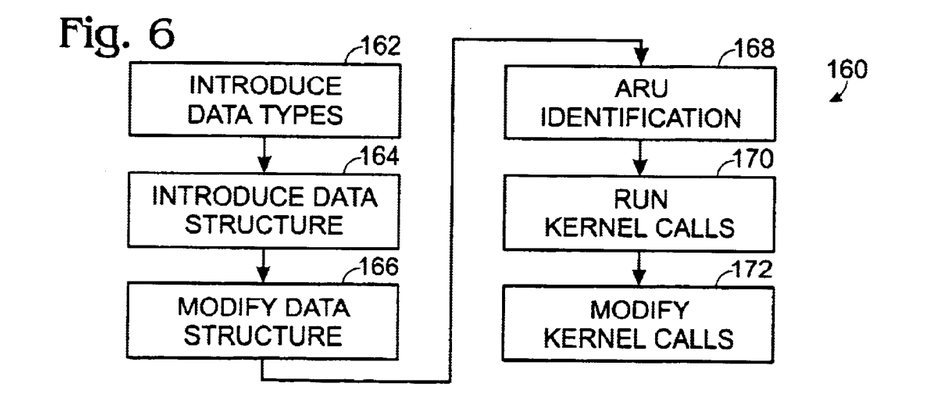
FIG. 6 is a block diagram of the method of the invention.

Data structures modified:
struct proc
    introduction of cellid
struct stat
    introduction of cellid
Kernel calls modified:
initialization( )
    set up all structures
fork( )
    for cellid inheritance
sysctl( );
    for access to sensitive information
    for initial cell to IP address mapping
kill( )
killpg( )
    for permission to signal a process
connect( )
in_pcbbind( )
    bind the cell->c_inaddr name to a socket
Sysctl values instroduced:
    ipaddr, CTLTYPE_INT
    cellfeatures, CTLTYPE_INT Sysctl values modified:
  hostname
  nisdomainname
User level commands introduced:
  switchcell [−n] cell name|cellid −c "/bin/sh commands"
    with the −n do not chroot to the cell's home directory
      chcell cellname|cellid files . . .
Configuration files introduced:
  /etc/cells
    Format:
      cellname:cellid:status:gecos:ipaddr:hostname:
      nisdomainname:hostid:features:celldir To summarize the method of the invention, and now referring to FIG. 6, the method is depicted generally at 160. The first step in the method is to introduce the data types, block 162. Next, the data structure is introduced, block 164. The data structure is then modified, block 166, and the ARUs provided with a specific identity, block 168. The usual kernel calls or, system calls, are activated, block 170, and finally, the modified kernel calls are run, block 172.

To better describe how the invention operates with the UNIX kernel, the UNIX operating system having the invention loaded therein will be described. Initially, when computer system 10 is switched on, the BIOS operates to load the UNIX operating system. This creates an environment and serves to activate the processes contained in computer system 10 and to allocate the physical resources, such as CPU space, memory space, and disc storage space. Any calls that a process may access are modified in accordance with the preceding code, the modified process table and the perhost table, so that, on start up, the calls are modified to segregate the ARUs and their contents, in effect, providing a barrier to prevent inter-ARU communication. Each ARU has a file structure, generally referred to as a file system, which includes directories, a number of files in each directory, and file names. As each ARU is associated with a single IP address, the host name for each ARU will serve as the address for communications with that ARU. The initialization allocates memory space and initializes the structures, and starts all of the other processes. The forking mechanism causes the child process to inherit all of the characteristics of the parent, including the parent's cell_id, file system, and associates the child with a particular ARU. A shell script, called init, activates the network interface, spawns the various processes, such as EMail(POP programs), and/or a web server(HTTP files), and allows a telnet to run in each ARU. Telnet is a standard process, that is loaded into each ARU, which listens for connections, asks for a login name and password, confirms access for a particular login name, and allows commands to be given to the processes in the ARU, with the previously identified limitations provided by the perhost table.

Additionally, restrictions are placed on the operating system to ensure that a process in one ARU cannot adversely affect the processes in other ARUs, or that the user giving a particular command is authorized to give such a command.

To further ensure security within the individual ARUs, the cell_id may be embedded into each file of a particular ARU. This makes for much easier resource accounting on the part of the ISP who is operating the system, and also ensures that a process in one ARU is not able to use a file from another ARU.

Although a preferred embodiment of the invention has been disclosed herein, it will be appreciated that further variations and modifications may be made thereto without departing from the scope of the invention as defined in the appended claims.

I claim:

1. A system of multiple work areas for operating within a computer system, wherein the computer system includes a CPU, a memory module and a disc storage facility, comprising:

plural autonomous resource units (ARUs), for running user processes, wherein each ARU includes a discrete IP address, and wherein a process running in one ARU is inaccessible by another ARU;

a discrete identifier assigned to each ARU; and a connector which extends to between each ARU and the computer system CPU and memory module.

2. The system of claim 1 wherein the disc storage facility includes a common storage region, wherein parent processes are contained in said common storage region, and wherein a parent process spawns a child process which is tagged with said discrete identifier and loaded into an ARU.

3. The system of claim 1 which includes a process look-up table containing said discrete identifier therein.

4. The system of claim 1 which includes a perhost look-up table for restricting access by a process to said IP address.

5. The system of claim 1 wherein each user process is tagged with said discrete identifier.

6. The system of claim 1 wherein each file in an ARU is tagged with said discrete identifier.

7. A method of providing multiple, discrete, secure work areas in a computer system having a disc storage facility, a CPU, a memory module and a set of IP addresses, comprising:

designating plural autonomous resource units(ARUs) in the disc storage facility;

providing a barrier to prevent inter-ARU communications;

assigning a discrete identifier to each ARU; and connecting each ARU to a CPU and memory module associated with the disc storage facility.

8. The method of claim 7 wherein said providing includes modifying a process look-up table to include a cell_id field, and associating the cell_id contained in the cell_id field with each process running in an ARU.

9. The method of claim 8 which further includes generating a perhost look-up table having a cell_id field and an IP address field, wherein each cell_id is associated with at least one IP address field.

10. The method of claim 9 wherein a process running in an ARU is granted access only to those IP addresses associated with the cell_id for the ARU.

11. The method of claim 7 wherein any child process loaded into an ARU is tagged with the discrete identifier.

12. The method of claim 7 wherein every file in an ARU is tagged with the discrete identifier.

13. The method of claim 7 wherein said assigning a discrete identifier includes copying a cell_id from a parent slot to a child slot in a fork( ) system call.

14. The method of claim 7 which includes running a child process in an ARU and which further includes modifying a kill( ) system call to include a determination of whether a recipient of a system call has the same cell_id as the sender of the system call.

15. The method of claim 7 wherein said connecting includes restricting access by a process to a connection between each ARU and CPU by requiring that an address and port be specified.

16. The method of claim 7 wherein said connecting includes assigning an unused address and port to a process if an address and port are not specified.

17. The method of claim 7 wherein said connecting includes changing a hostname for a requesting process's cell_id.

18. The method of claim 7 wherein said connecting includes changing an address for a requesting process's cell_id.

19. A system of multiple work areas for operating within a computer system, wherein the computer system includes a CPU and a memory module, comprising:

plural autonomous resource units(ARUs), for running user processes, wherein each ARU includes a discrete IP address, and wherein a process running in one ARU is inaccessible by another ARU;

a discrete identifier assigned to each ARU;

a process look-up table containing said discrete identifier therein;

a perhost look-up table for restricting access by a process to said IP address;

a disc storage facility including a common storage region, wherein parent processes are contained in said common storage region, and wherein a parent process spawns a child process which is tagged with said discrete identifier and loaded into an ARU; and a connector which extends to between each ARU and the computer system CPU and memory module.

20. The system of claim 19 wherein each user process is tagged with said discrete identifier and wherein each file in an ARU is tagged with said discrete identifier.

* * * * *